United States Patent

[11] 3,633,164

[72] Inventors Donald P. Hynes
West Covina;
William H. Clopton, Pasadena, both of Calif.

[21] Appl. No. 880,772
[22] Filed Nov. 28, 1969
[45] Patented Jan. 4, 1972
[73] Assignee Burroughs Corporation
Detroit, Mich.

[54] DATA COMMUNICATION SYSTEM FOR SERVICING TWO DIFFERENT TYPES OF REMOTE TERMINAL UNITS OVER A SINGLE TRANSMISSION LINE
2 Claims, 2 Drawing Figs.

[52] U.S. Cl. .......... 340/147 R, 178/50
[51] Int. Cl. .......... H04q 5/00
[50] Field of Search .......... 340/147, 150–152; 178/50, 69.5; 179/15 BS, 15 BA

[56] References Cited

UNITED STATES PATENTS

| | | | |
|---|---|---|---|
| 3,230,509 | 1/1966 | Spencer .......... | 340/147 X |
| 3,288,928 | 11/1966 | Bartlett et al. .......... | 178/50 |
| 3,457,550 | 7/1969 | Gibson et al. .......... | 340/147 |

*Primary Examiner*—Donald J. Yusko
*Attorney*—Christie, Parker & Hale

ABSTRACT: There is described a data communication system by which a processor may selectively poll two different types of terminal units at a remote station. Special characters in the polling message, when sensed at the sending station, switch the line adapter and control circuit of the sending station to transmit the polling message on the line in the required form for one or the other of the two types of terminal units. The data sets are arranged to transmit a control signal which operates a switch at the remote station to connect the designated type of terminal units to the line in response to the sensing of the particular special character associated with the polling message.

INVENTOR.
DONALD P. HYNES
WILLIAM H. CLOPTON
BY
Christie, Parker, & Hale
ATTORNEYS

DATA COMMUNICATION SYSTEM FOR SERVICING TWO DIFFERENT TYPES OF REMOTE TERMINAL UNITS OVER A SINGLE TRANSMISSION LINE

FIELD OF THE INVENTION

This invention relates to digital processing systems, and more particularly to a data communication system for connecting a processor to different types of remote terminal units over a single transmission line.

BACKGROUND OF THE INVENTION

On-line operation of data processors in communication with remote stations over telephone communication lines and the like is well known. One such arrangement involving a single multiline control for communicating over a plurality of telephone lines on a time-sharing basis is described in copending application Ser. No. 626,015 filed Mar. 27, 1967, and assigned to the same assignee as the present invention. In such a system the single multiline control of the data processor provides transfer of digitized data with a plurality of remote stations over separate telephone lines. The multiline control operates a plurality of line adapters in sequence, there being one line adapter for each communication line. Each remote station may have one or more terminal input/output units capable of receiving or transmitting digital information. Each line adapter is specifically designed to operate with a particular type of remote terminal unit. The line adapter, in combination with the multiline control, must be arranged to take into account whether the input/output unit transmits characters with the most significant bit first or last, whether vertical parity is used, whether even or odd parity is used, whether transmission is synchronous or asynchronous, etc. As a result, only one type of remote terminal unit can be used at the remote station. If the type of input/output unit is changed, the adapter must be changed and the control circuitry in the multiline control is modified accordingly.

SUMMARY OF THE INVENTION

The present invention is directed to an improvement in the data communication system of the type describèd in the above-identified copending application. The improvement permits more than one type of input/output unit at a single remote station to be serviced by the processor over a single data communication line. This is accomplished by decoding a special character in the multiline control at the start of transmission of a polling message to a particular remote station. The special character identifies which of the two types of units at the remote station is being polled. The character is decoded by the control unit, providing a control signal to the line adapter which in turn provides s signal to the data set. The data set generates a unique signal which is demodulated at the remote data set to operate a switch, the switch connecting the data set at the remote station to a particular one of the two types of terminal units. At the same time, the line adapter is modified along with the control unit to transmit in the required format, speed, parity, etc., for the corresponding type of remote unit.

BRIEF DESCRIPTION OF THE DRAWINGS

For a more complete understanding of the invention reference should be made to the accompanying drawings, wherein.

DETAILED DESCRIPTION

Figure 1:
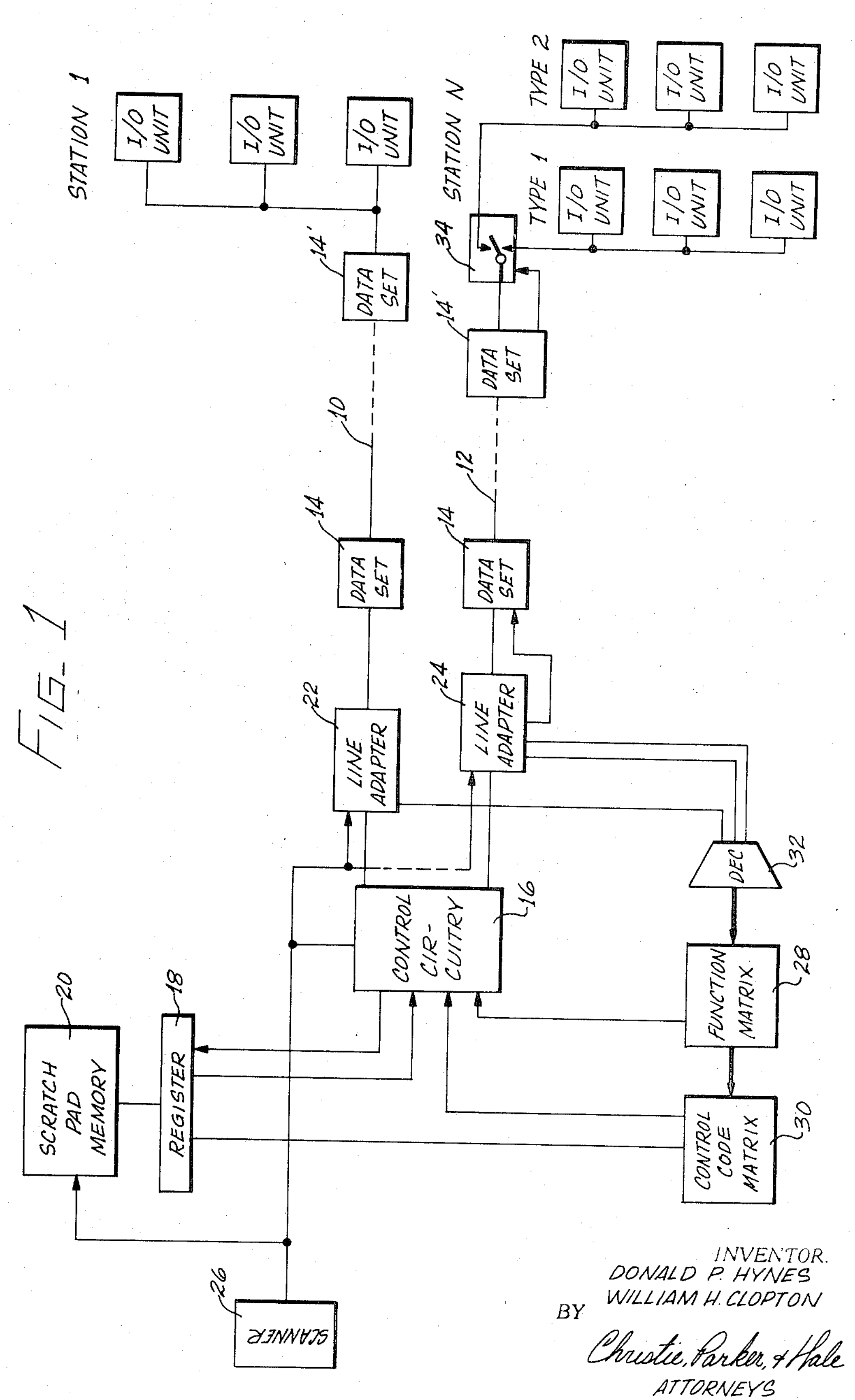
FIG. 1 is a block diagram of the data communication system.

Referring to FIG. 1, there is shown a portion of a data communication system of the type described in detail in the above-identified copending application. This system provides communication between a processor (not shown) and a plurality of remote stations, two of which are indicated as station 1 and station N. Communication with the remote stations is over standard telephone lines, for example, two of which are indicated at 10 and 12. The telephone lines are terminated at each end by standard modulation and demodulation equipment, known as data sets, for transmitting digital data on the telephone lines. The data sets are indicated at 14′, 14 and may be of any well-known type, either synchronous or asynchronous, in which information is transmitted in serial pulse form such as by switching the voltage level between two states, referred to as Mark and Space.

Control of the transmission and reception of message characters between the processor and the remote stations over the various communication lines is provided on a time-sharing basis by a multiline control unit including control circuitry 16 which controls transfer of characters between a register 18 associated with a scratchpad memory 20 and a plurality of line adapters, two of which are indicated at 22 and 24. A scanner 26 identifies or points to each of the transmission lines in sequence. When the scanner points to a particular line, it causes a control word associated with that line to be read out of the scratchpad memory 20 into the register 18. At the same time, it activates the associated one of the line adapters.

During transmission, characters to be transmitted over a particular communication line are first transferred a character at a time from the processor to the register 18 and stored in the scratchpad memory, each character being coded according to the internal code of the processor. Each character is then transmitted over the corresponding communication line to the remote station by means of the control circuitry 16 and the particular line adapter. The line adapter, when activated by the scanner 26, provides a coded output signal which is applied to a function matrix 28 and control code matrix 30 through a decoder 32. The function matrix and control code matrix modify the control circuitry 16 to recognize control characters, and to carry out control functions necessary to transmit and receive characters according to the conditions required by the particular type of equipment at the remote station.

In the past, each line adapter, in combination with the function matrix and control code matrix, set up unique operating conditions for one type of remote terminal unit. For example, if the remote terminal unit was a teletype machine, the control circuitry provided the necessary translation of the characters into the proper format for the internal code of the teletype equipment. At the same time, the line adapter provided the correct bit rate for the remote equipment, within the limits of the operation of the data sets. In the past, the only way more than one type of equipment could be accommodated at a remote station was to utilize two separate line adapters and communication lines from the multiline control to the remote station.

By the arrangement of the present invention two different types of equipment at the remote station can be serviced over a single communication line. Normally communication with a remote terminal station is initiated at the processor by a polling message being transmitted to the remote station which polls each of the input/output terminal units. In response to the polling message, a particular input/output unit at the remote station acknowledges that the unit is ready to transmit or receive data. Such a polling technique is described in more detail in U.S. Pat. No. 3,407,387. While it has been possible heretofore to poll a number of different input/output units at one remote station, all of the input/output units had to be of the same type.

Where two types of units are in service at the remote station, the polling message generated by the processor, according to the present invention, is programmatically provided with a unique character identifying which type of unit at the remote station is being polled. This special character when present, provides a signal at the output of the line adapter 24 which is applied to the data set 14 at the start of transmission of the polling message. This signal is transmitted and recognized by the data set at the remote station, and is used to activate a switching unit 34 which selectively connects one or the other of the two types of input/output units to the data set at the remote station.

Figure 2:
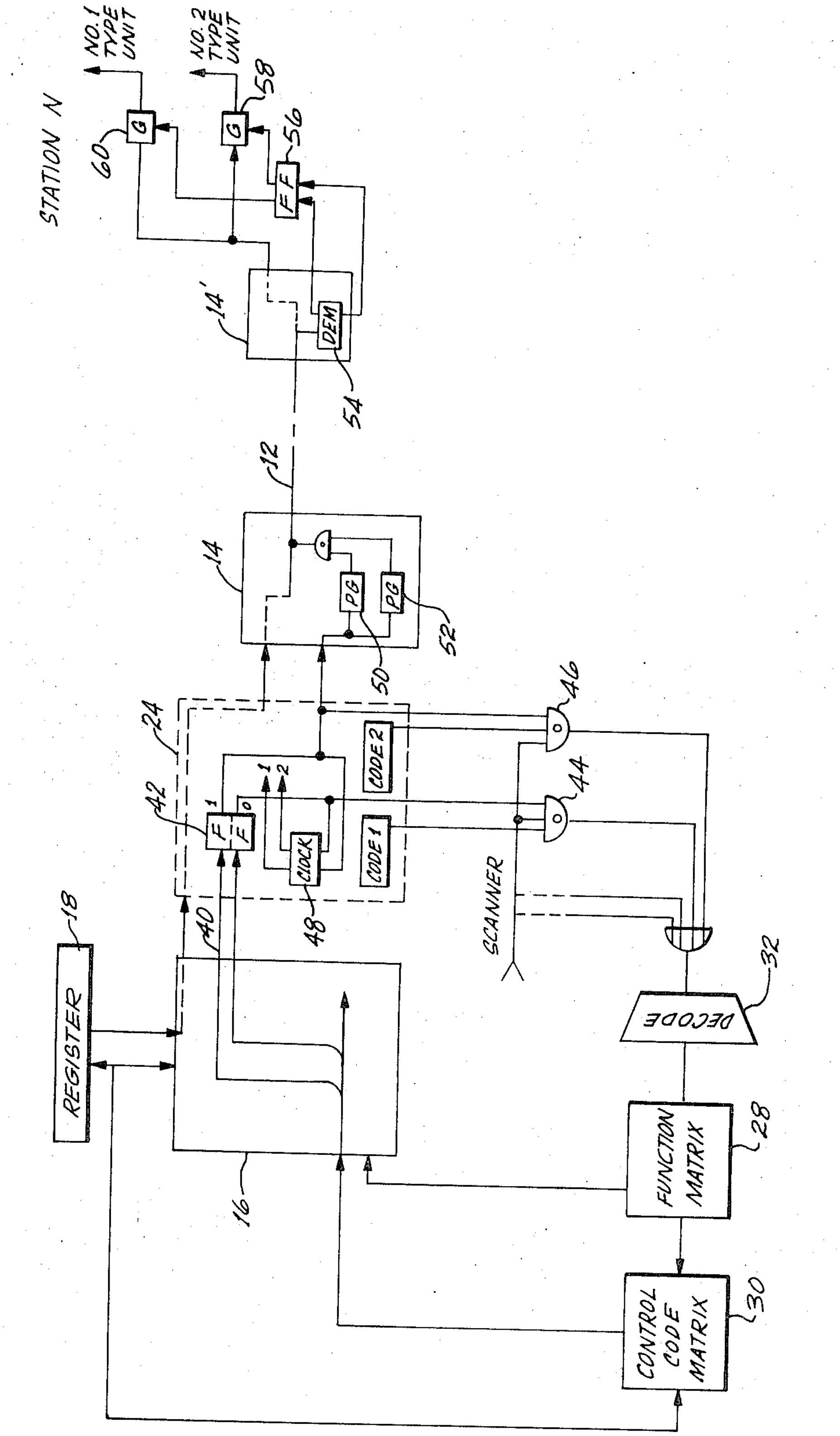
FIG. 2 is a block schematic diagram showing the operation of the present invention.

This is accomplished, as shown in more detail in FIG. 2, by the control code matrix 30 which recognizes the special character when it is present in the register 18. Assuming that the scanner 26 points to the communication line 12 and the remote station N, as shown in FIG. 2, the control word from the scratchpad memory is first placed in the register 18. This control word includes the first character of the polling message to be transmitted to the remote station. This character is applied to the control code matrix 30 which is arranged to recognize and decode control characters, in the manner described in the above-identified copending application. If, for example, the character is a special character indicating that the subsequent characters are to be transmitted to the second type of input/output units at the station N, the control code matrix provides a signal on a control line 40 going to the line adapter 24. This control line sets a flip-flop 42 to the 1 state. In the absence of the special character in the register 18, the flip-flop 42 is normally in the 0 state. The 0 state corresponds to the normal mode of operation in which communication is assumed to take place with the first type of units at the remote station.

The two output states of the flip-flop 42 are applied respectively to AND-circuits 44 and 46. These gates, when activated by the scanner, selectively gate a first or second code to the decoder 32. Code number 1 signals that the adapter is operating with the first type units at the remote station while code number 2 indicates that the adapter is operating with the second type units at the remote station.

The output of the flip-flop 42 also is used to select one or the other of two different clock rates from a clock generator 48 to provide the proper bit rate according to which type of unit is being serviced at the remote station.

The flip-flop 42 also provides a control level at an input terminal to the data set 14. The data set includes first and second pulse generators, indicated at 50 and 52. These may be monostable multivibrators, for example, which present pulses on the line of two different time durations. The pulse generator 50 is activated when the flip-flop 42 goes from the 0 state to the 1 state while the pulse generator 52 is activated whenever the flip-flop goes from the 1 state to the 0 state In this manner, the data set puts a pulse on the line to the remote station indicating a change in state, the duration of the pulse indicating which type of remote unit is being signaled. The pulse generated by the generators 50 and 52 is substantially longer in duration than the normal information bit time on the line 12, but is substantially shorter than the time required to indicate a break in communication.

The data set 14' at the remote station includes a suitable pulse demodulator circuit 54 which generates an output signal on one of two outputs in response to the pulses placed on the line 12 respectively by the pulse generators 50 and 52. The output of the demodulator circuit 54 sets a control flip-flop 56 to either the 0 or the 1 state. The two states of the flip-flop 56 in turn control a pair of gates 58 and 60 for coupling the output of the data set 14' to either the first type of units or to the second type of units at the remote station.

In operation, the flip-flops 42 and 56 are normally reset to the 0 state and remain this way until a special character is identified by the control code matrix 30 for setting the flip-flop 42 to the 1 state. This causes the pulse generator 50 to generate a pulse which is demodulated at the data set 14 at the remote station, setting the flip-flop 56 to the 1 state. This condition remains until another special character, for example, signals that the first type of remote unit is being polled. This special character may provide an output from the control code matrix 30 which resets the flip-flop 42 to 0, causing the pulse generator 52 to generate a pulse which resets the flip-flop 56 to 0. In this manner, the processor can initiate communication with either of two types of input/output units at a remote station over a single communication line. The control code matrix 30 and the function matrix 28 in response to the output of one or the other of the AND-circuits 44 and 46 modifies the control circuitry 16 in any manner necessary to accommodate any difference in the format, parity, recognition of control code characters, and the like, peculiar to the two different types of units at the remote station. Also the bit rate over the communication line is established by the line adapter to conform with the requirements of one or the other of the two types of input/output units at the remote station.

What is claimed is:

1. Apparatus transmitting digital data over a common transmission line to a remote station having two types of input/output units requiring two different data transmission modes from a single digital data source, comprising means at the source for storing a plurality of digitally coded characters, first control means for transferring digitally coded characters from said storing means to the transmission line in a first data transmission mode, means responsive to a predetermined digitally coded control character from said storing means for generating a control signal indicating a change to a second data transmission mode and including means interrupting transmission of said predetermined digitally coded control character to the remote station, switching means at the remote station for selectively connecting one or the other of two types of input/output units to the transmission line, means responsive to the control signal and coupled to the transmission line at the remote station for activating said switching means at the remote station to switch from one type of input/output unit to the other type, second control means for transferring digitally coded characters from said storing means to the transmission line in a second data transmission mode, and means responsive to said control signal for activating the second control means to transmit additional characters from the storing means in the second transmission mode.

2. Apparatus for transmitting data to at least two different types of units at a remote station over a single transmission line wherein the two types of remote units require respectively data to be transmitted in distinct modes of transmission, comprising a buffer register control means coupling the digitally coded characters from the register to the transmission line in one of two data transmission modes corresponding respectively to the two modes to which the two types of remote units respond, decoding means coupled to the register for decoding each character stored in the register, means responsive to the decoding means when a predetermined control character is present for switching the control means from one transmission mode to the other, means responsive to the decoding means for initiating a control signal over the transmission line to the remote station, and switching means at the remote station responsive to said control signal for switching from one type of unit to the other type of unit.

* * * * *